Patented Aug. 21, 1934

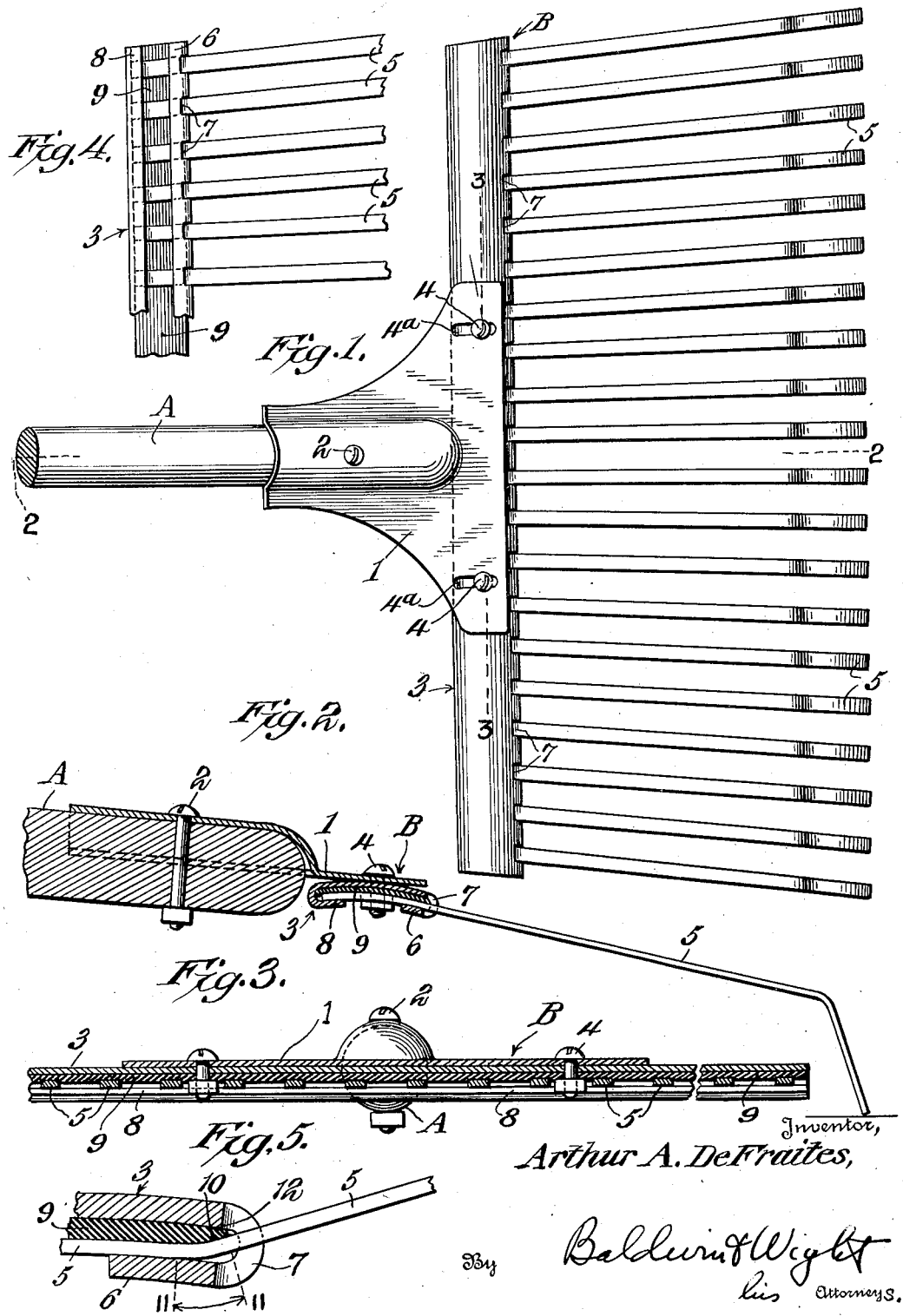

1,970,903

UNITED STATES PATENT OFFICE 1,970,903

RAKE

Arthur A. De Fraites, New Orleans, La., assignor, by mesne assignments, to Valley Manufacturing Corporation, a corporation of Louisiana Application February 24, 1933, Serial No. 658,399

4 Claims. (Cl. 55—114)

This invention relates to rakes and more particularly to spring-toothed lawn rakes of the kind including a relatively rigid frame and a plurality of relatively flexible teeth or tines connected to the frame.

In rakes of this class heretofore known, the tines and frame have been connected rigidly in metal-to-metal contact, and after being used for a short while the tines have become loosened in the frame, resulting in a tendency for the tines to rattle and to become displaced accidentally. A further difficulty with prior rakes of this character has been due to the sharp bending of the tines about a sharp edge on the frame when the rake is used, often resulting in breakage of the tines.

An object of the present invention is to provide a rake of the general class referred to including resilient cushioning material interposed between the tines and the frame for preventing rattling and accidental displacement of the tines from the frame, the cushioning material being so positioned as to prevent abrupt bending of the tines against the edge of the frame, increasing the life of the tines. More specific objects will become apparent from a reading of the following description, the appended claims, and the accompanying drawing, in which:

Figure 1 is a top plan view of a rake embodying the invention;

Figure 2 is a vertical sectional view taken on the line 2—2 of Figure 1;

Figure 3 is a vertical sectional view taken on the line 3—3 of Figure 1;

Figure 4 is a fragmentary bottom plan view of the rake shown in Figure 1; and

Figure 5 is a detail view on an enlarged scale and in vertical section of a portion of a rake frame, a tine, and resilient cushioning material interposed between the tine and the frame.

The invention is illustrated by way of example as being embodied in a rake of the general character disclosed in the copending application of Wenceslaus G. Rocquin, filed February 24, 1933, Serial No. 658,392, but may be embodied also in rakes of somewhat different construction. The rake shown includes a handle A and a rake proper B connected to an attaching plate 1 which is secured to the handle A by means of a bolt 2. The rake proper B includes a frame 3 adjustably connected to the plate 1 by means of bolts 4—4 passing through slots 4ª—4ª in the plate and engaging the frame for clamping the latter tightly against the plate 1, and a plurality of resilient metallic tines 5. The front edge portion 6 of the frame 3 is return-bent under the frame and is provided with a plurality of spaced openings 7 through which the tines 5 extend, the rear edge portion 8 of the frame 3 being return-bent so as to lie under and engage the rear ends of the tines 5.

In accordance with the invention, I interpose a strip or pad of resilient cushioning material 9, such as rubber, between the tines and the frame 3. In the form shown, the strip 9 extends throughout the length of the frame between the return-bent portions 6 and 8 thereof. The arrangement is such that the upper faces of the portions of the tines extending between the front and rear edges of the frame are in contact with the resilient material 9, the latter thereby providing a cushion mounting for the tines which serves to prevent rattling and displacement of the tines from the frame.

As best shown in Figure 5, the cushioning material 9 is interposed between the tines and the front portion of the metallic frame underlying the tines, so that, when the rake is in use and the tines are bent upwardly, the under side of the front edge portion of the cushioning material will give to provide an extended curved abutment surface 10 about which the tine is bent smoothly throughout an extended area 11—11. The cushioning material thereby serves to prevent the sharp bending which would occur if the tines were bent about the sharp edge portion 12 of the frame, the life of the tines being thereby materially increased.

It will be apparent from the foregoing that a rake constructed in accordance with my invention overcomes the enumerated disadvantages of prior rakes in that there can be no rattling of the tines and the life of the tines is increased materially. Although the form of rake shown by way of example is believed to be a practical embodiment of the invention, it will be understood that various changes may be made in the details of construction and relative arrangement of parts without departing from the invention as defined in the claims.

I claim:

1. In a rake, the combination of a cross frame member comprising a plate having its front and rear edge portions return-bent inwardly, the front edge being provided at its bend with a plurality of spaced openings; a plurality of tines passing respectively through said openings and having their rear end portions disposed under the return-bent rear edge portion of said plate; and resilient cushioning material interposed between the frame member proper and the portions of said tines intervening between said return-bent frame edges.

2. In a rake, the combination of a cross frame member comprising a plate deformed in cross section and having its front and rear edge portions return-bent inwardly, the front edge being provided at its bend with a plurality of spaced openings; a plurality of tines passing respectively through said openings and having their rear end portions disposed under the return-bent rear edge portion of said plate; and resilient cushioning material interposed between the deformed part of said frame member and the portions of said tines intervening between said return-bent frame edges.

3. In a rake, the combination of a metallic tine-supporting frame; a plurality of resilient metallic tines having their rear end portions extending under the frame; resilient cushioning material interposed between the front portion of the frame overlying said tines and the tines; and means for securing said tines to said frame and against said cushioning material with the tines out of contact with the overlying front portion of said frame whereby abrupt bending of the tines is avoided.

4. In a rake, the combination of a tine-supporting frame; a plurality of tines connected to and underlying a portion of said frame, said tines having their outer ends bent downwardly; a cushioning pad interposed between the upper faces of said tines and the foremost portion of said frame overlying said tines, said cushioning pad maintaining the upper faces of said tines out of contact with the overlying portion of said frame whereby abrupt bending of the tines is avoided; and means for securing said tines in position under said cushioning pad.

ARTHUR A. DE FRAITES.